(12) United States Patent
Yoo et al.

(10) Patent No.: US 7,570,874 B2
(45) Date of Patent: *Aug. 4, 2009

(54) METHOD AND APPARATUS FOR RECORDING DIGITAL DATA STREAMS

(75) Inventors: Jea-Yong Yoo, Seoul (KR); Byung-Jin Kim, Kyunggi-do (KR); Kang-Soo Seo, Kyunggi-do (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 1164 days.

This patent is subject to a terminal disclaimer.

(21) Appl. No.: 10/747,947

(22) Filed: Dec. 31, 2003

(65) Prior Publication Data

US 2004/0151478 A1 Aug. 5, 2004

Related U.S. Application Data

(63) Continuation of application No. 10/679,263, filed on Oct. 7, 2003, now Pat. No. 7,489,854, which is a continuation of application No. 09/477,344, filed on Jan. 4, 2000, now Pat. No. 6,701,059.

(30) Foreign Application Priority Data

Jan. 4, 1999 (KR) .................................. 99-00602

(51) Int. Cl.
*H04N 7/26* (2006.01)
*H04N 5/00* (2006.01)
(52) U.S. Cl. ........................................ 386/125; 386/124
(58) Field of Classification Search ............... 386/46, 386/109, 125, 111, 112, 124, 27, 33, 95
See application file for complete search history.

(56) References Cited

U.S. PATENT DOCUMENTS

| 5,528,569 | A  | * | 6/1996 | Fujiie et al. ............ 369/47.31 |
| 6,009,229 | A  |   | 12/1999 | Kawamura |
| 6,470,135 | B1 |   | 10/2002 | Kim et al. |
| 2002/0090207 | A1 | * | 7/2002 | Mishima et al. ............ 386/111 |

FOREIGN PATENT DOCUMENTS

| CN | 1212427 A | 3/1999 |
| DE | 19546327 | 6/1997 |
| DE | 19719904 | 1/1998 |
| EP | 0 797 203 A2 | 9/1997 |
| JP | 5002834 | 1/1993 |
| JP | 8-293157 A | 11/1996 |
| JP | 08-306137 | 11/1996 |
| JP | 08-339630 | 12/1996 |
| JP | 9-251-762 | 9/1997 |
| JP | 9-282849 A | 10/1997 |
| JP | 10-222938 | 8/1998 |
| JP | 10-320928 A | 12/1998 |

* cited by examiner

*Primary Examiner*—Robert Chevalier
(74) *Attorney, Agent, or Firm*—Birch, Stewart, Kolasch & Birch, LLP

(57) ABSTRACT

A recording medium with the increased recording efficiency is provided. Depending upon the size of the remaining area of a sector, a transport stream unit is recorded across two sectors with the result that sectors contain no null data. If the size of the remaining area of the last sector of a stream object unit is less than the size of a transport stream unit, the remaining area is padded with null data.

24 Claims, 6 Drawing Sheets

*Conventional Art*

FIG. 3

| Application Header | | | |
|---|---|---|---|
| Field | Number of bits | Number of bytes | Value |
| VERSION | 8 | 1 | 01h |
| APPLICATION_ID | 16 | 2 | |
| MAX_BITRATE | 32 | 4 | |
| SMOOTH_BUF_SIZ | 16 | 2 | '3540 bytes' |
| TS_REF_CL_FREQ. | 32 | 4 | '27MHz' |
| AP_PKT_LEN | 16 | 2 | |
| TS_LEN | 8 | 1 | 04h |
| AP_PKT_Ns | 8 | 1 | |
| START_OF_STR | 1 | | 0b or 1b |
| END_OF_STR | 1 | 1 | 0b or 1b |
| Reserved | 6 | | 111111b |
| Reserved | 56 | 7 | 7x (FFh) |
| Total | 200 | 25 | |

*Conventional Art*

*Conventional Art*

FIG. 6

| Application Header | | | |
|---|---|---|---|
| Field | Number of bits | Number of bytes | Value |
| VERSION | 8 | 1 | 01h |
| APPLICATION_ID | 16 | 2 | |
| MAX_BITRATE | 32 | 4 | |
| SMOOTH_BUF_SIZ | 16 | 2 | '3540 bytes' |
| TS_REF_CL_FREQ. | 32 | 4 | '27MHz' |
| AP_PKT_LEN | 16 | 2 | |
| TS_LEN | 8 | 1 | 04h |
| AP_PKT_Ns | 8 | 1 | |
| START_OF_STR | 1 | | 0b or 1b |
| END_OF_STR | 1 | 1 | 0b or 1b |
| COM_SZ | 6 | | |
| Reserved | 56 | 7 | 7x (FFh) |
| Total | 200 | 25 | |

METHOD AND APPARATUS FOR RECORDING DIGITAL DATA STREAMS

This nonprovisional application claims priority under 35 U.S.C. § 120 as a continuation of patent application Ser. No. 10/679,263 filed in the U.S. on Oct. 7, 2003 which is a continuation of patent application Ser. No. 09/477,344 filed in the U.S. on Jan. 4, 2000, the entire contents of which are hereby incorporated by reference.

This nonprovisional application also claims priority under 35 U.S.C. §119(a) on patent application no. 1999-602 filed in Korea on Jan. 4, 1999, the entire contents of which are hereby incorporated by reference.

BACKGROUND OF THE INVENTION

1. Field of the Invention

The present invention generally relates to method and apparatus for recording digital data streams, and more particularly, but not by way of limitation, to method and apparatus for recording transport stream units of a digital data stream in stream object units of a recording medium having sectors of a fixed size.

2. Description of the Related Art

In the conventional analog television broadcast, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards the digital broadcast.

The digital broadcast offers several advantages that its analog counterpart cannot provide. For example, the digital broadcast is capable of providing services with far more improved video/audio quality, transmitting several different programs within a fixed bandwidth, and offering enhanced compatibility with digital communication media or digital storage media.

In the digital broadcast, a plurality of programs encoded based upon the MPEG format are multiplexed into a single transport stream before transmitted. The transmitted transport stream is received by a set top box at the receiver and demultiplexed into original programs. If a program is chosen from among the demultiplexed programs, the chosen program is decoded by a decoder in the set top box and original audio and video signals are retrieved. The retrieved audio and video signals can be presented by an A/V output apparatus such as a TV.

FIG. 1 depicts a block diagram of a general digital data stream recording apparatus comprising a set top box 100, a communication interface (IEEE-1394), and a streamer 200. The set top box 100 receives transport streams encoded by system encoders and broadcast by a plurality of broadcasting stations and demultiplexes the received transport streams. After a system decoder 120 decodes the transport stream of a program tuned by a tuning unit 110, a control unit 140 outputs the decoded transport stream to an A/V output device such as a TV set for presentation. The set top box 100 may transmit a program chosen by a user to the streamer 200 through the IEEE-1394 interface so that the transmitted program is recorded on a recording medium 230 such as a digital video disk by the streamer 200.

Requested by a user, the set top box 100 may receive a program retrieved from the recording medium 230 by the streamer 200 through the IEEE-1394 communication interface so that the received program can be presented on a TV set after being decoded by the decoder 120.

For recording the received digital broadcast signals on a recording medium, it is necessary to develop schemes for organizing the received digital data streams on the recording medium as groups of stream object units and creating management information for the stream object units. However, no international standard for such schemes is available yet and thus various methods have been proposed by relevant developers.

A conventional method for creating stream object units will be explained with reference to accompanying drawings.

FIG. 2 shows the syntax of several digital data stream recording units. A stream object (SOB), which is a single recorded program, comprises a plurality of stream object units and a stream object unit (SOBU) comprises a plurality of sectors. A sector further comprises a plurality of transport stream packets (TSPs) and header information (HDRS) regarding the transport stream packets.

To be more specific with figures, the size of a transport stream packet is 192 bytes, the size of the header information (HDRS) is 100 bytes, and the size of a sector is 2048 bytes. A sector of 2048 bytes comprises a 100-byte header information (HDRS), 10 192-byte transport stream packets, and a 28-byte padding area padded with null data. The 100-byte header information (HDRS) further comprises a sector header for identifying the sector and several headers. A transport stream packet comprises a 4-byte time stamp representing the packet arrival time and a 188-byte application packet.

FIG. 3 is a detailed view of the application header recorded in the header information area (HDRS). The application header comprises several fields representing the header format version (VERSION), the identification code of the data stream (APPLICATION_ID), the maximum bit transfer rate of the data stream (MAX_BITRATE), the buffer size (SMOOTH_BUF_SZ), the reference clock frequency for packet arrival/transmission (TS_REF_CL_FREQ), the length of a transport stream packet (AP_PKT_LEN), the length of a transport packet arrival time (TS_LEN), the number of transport stream packets (AP_PKT_Ns), the first transport stream packet of the data stream (START_OF_STR), and the last transport stream packet of the data stream (END_OF_STR). The number of 188 representing that the size of a transport stream packet except the time stamp is 188 bytes is recorded in 2 bytes in the field of AP_PKT_LEN and the number of 10 representing that a sector comprises 10 transport stream packets is recorded in 1 byte in the field of AP_PKT_Ns.

According to the conventional method for recording digital data streams, a predetermined number of sectors are grouped into a stream object unit (SOBU) and a sector comprises 100-byte header information (HDRS), 10 192-byte transport stream packets including time stamps, and 28-byte padding area, as shown in FIG. 4, As a result, a stream object unit (SOBU) comprising 32 sectors contains 32 28-byte padding areas and therefore the size of padding areas contained in a stream object unit (SOBU) amounts to 886 bytes. As the padding area contains no useful information, such a recording method severely impairs the recording efficiency of the recording medium.

SUMMARY OF THE INVENTION

It is an object of the present invention to provide method and apparatus for recording digital data streams that minimizes the size of recording area padded with null data.

Method and apparatus for recording digital data streams in accordance with an aspect of the present invention comprises recording received transport stream packets sequentially in a sector and recording a transport stream packet across two sectors when the size of the remaining area of a sector is less than the size of a transport stream unit.

Another method and apparatus for recording digital data streams in accordance with the present invention comprises recording received transport stream packets, checking the size of the recorded transport stream packets, and grouping the received transport stream packets into a stream object unit by adding unwritten area depending upon the checked size information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 3 is a pictorial representation of a general application header of transport stream units;

FIG. 6 is a pictorial representation of an application header in accordance with the present invention.

DETAILED DESCRIPTION OF THE PREFFERRED EMBODIMENTS

In order that the invention may be fully understood, preferred embodiments thereof will now be described with reference to the accompanying drawings.

Figure 1:
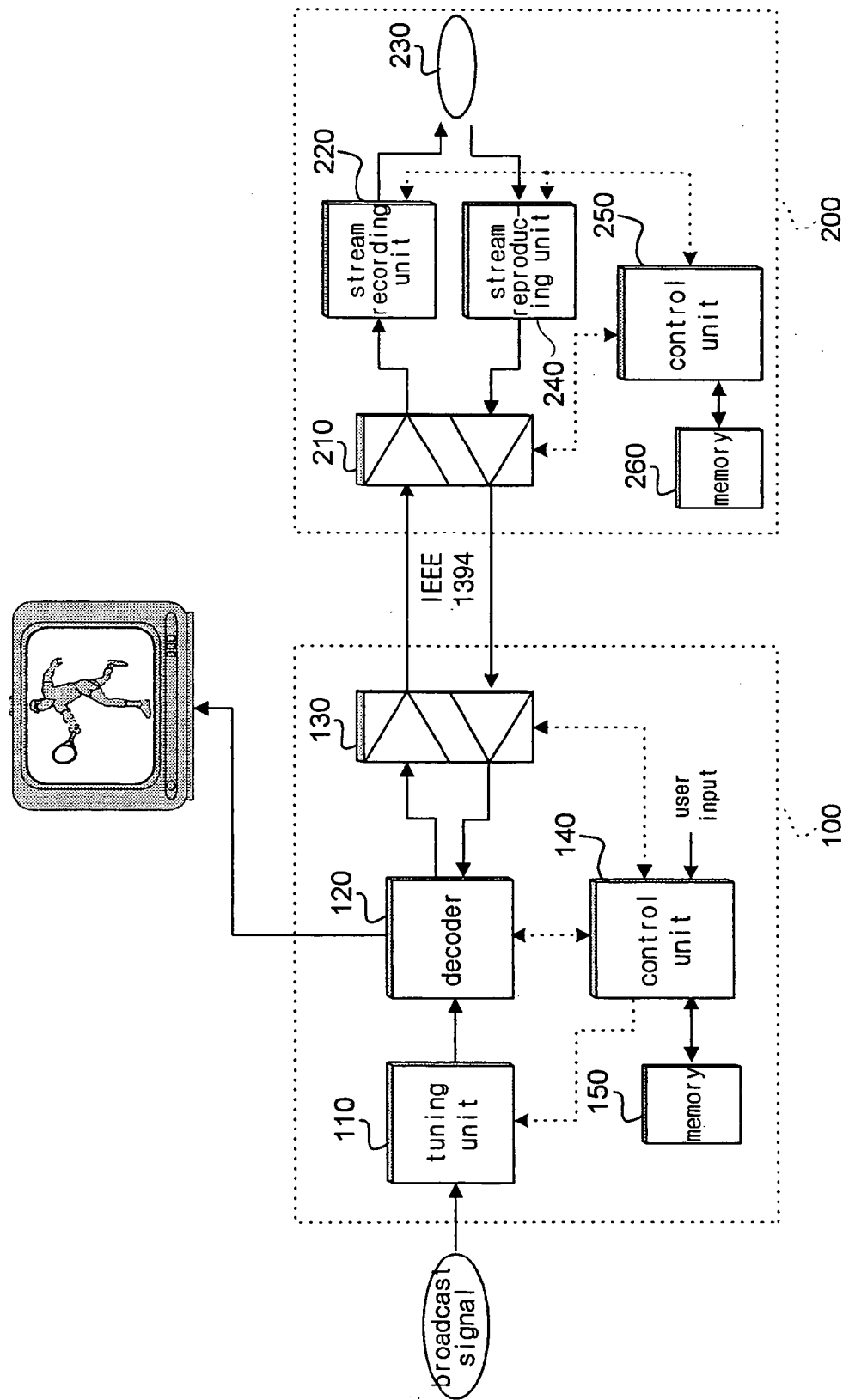
FIG. 1 is a block diagram of a general digital data stream recording apparatus.
Figure 2:
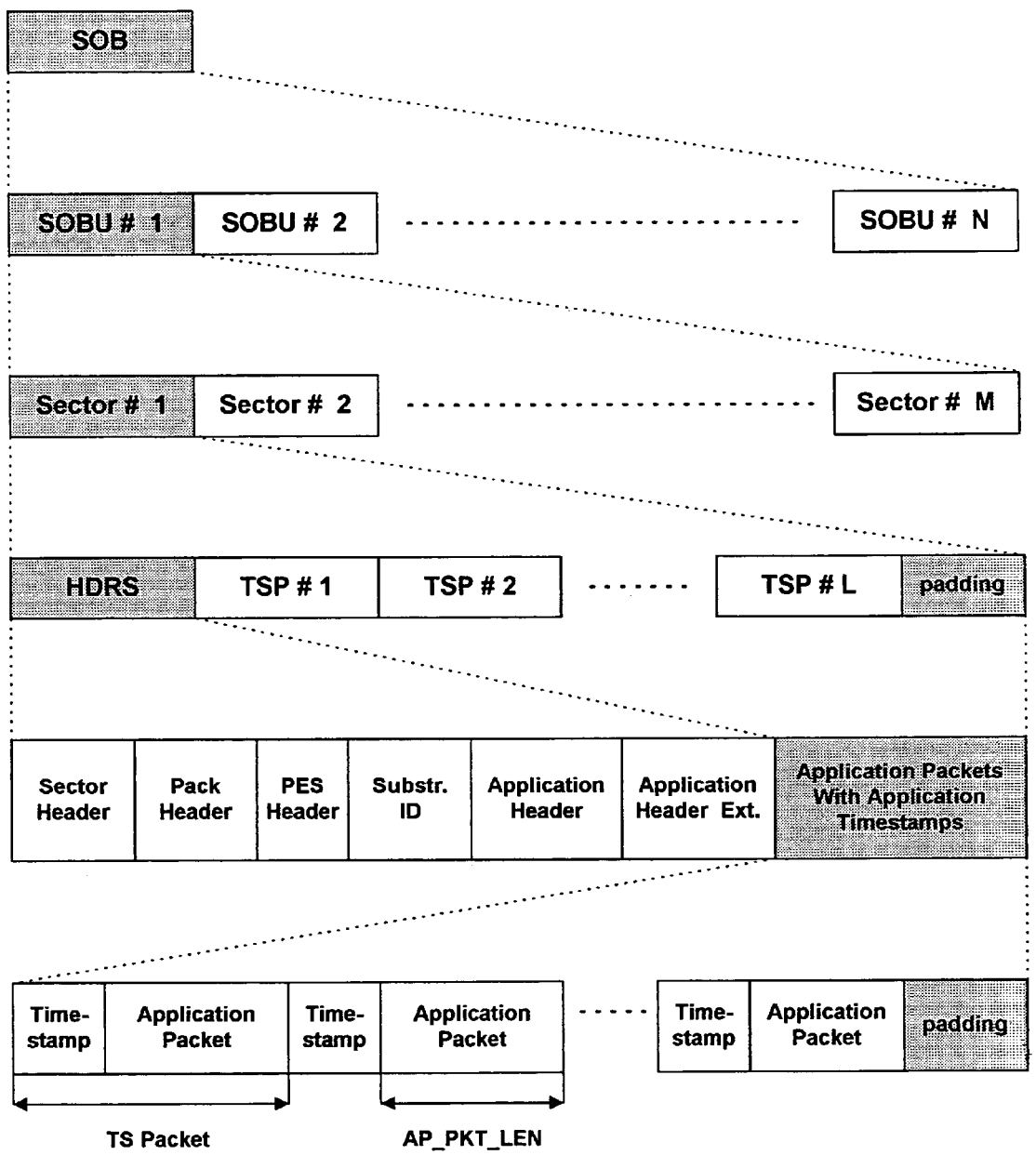
FIG. 2 is a pictorial representation of the syntax of general digital data stream recording units.
Figure 4:
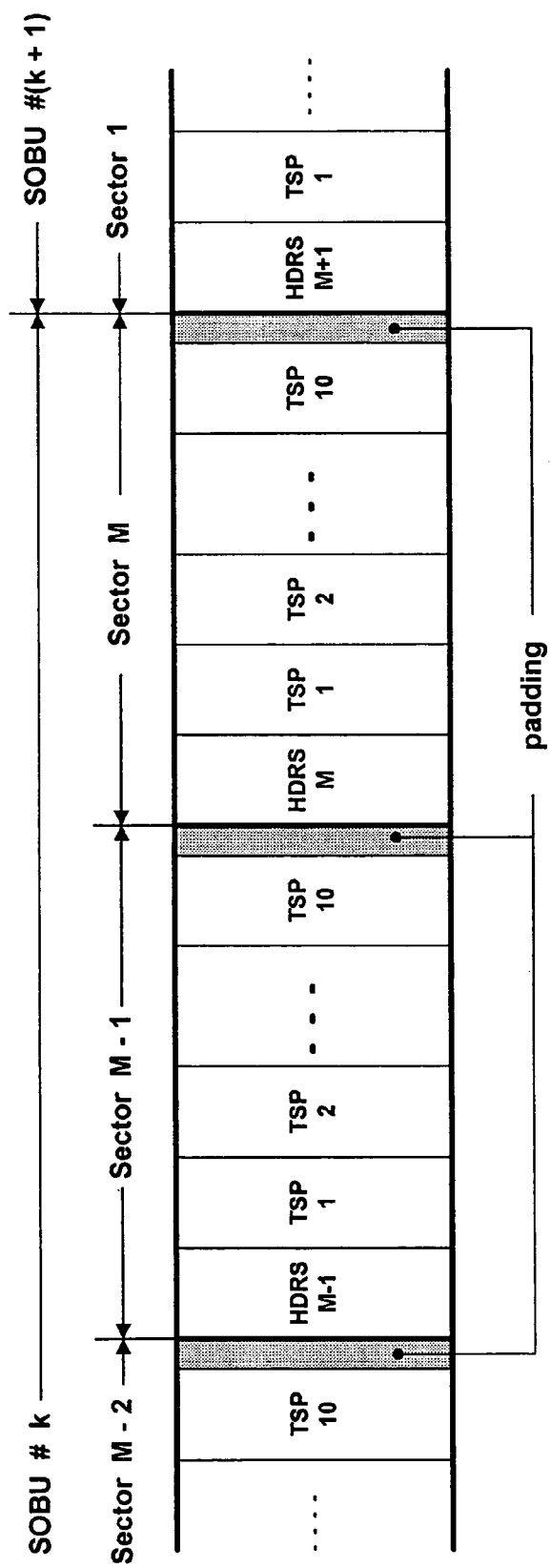
FIG. 4 is a pictorial representation of sectors and stream object units created by the conventional recording method.
Figure 5:
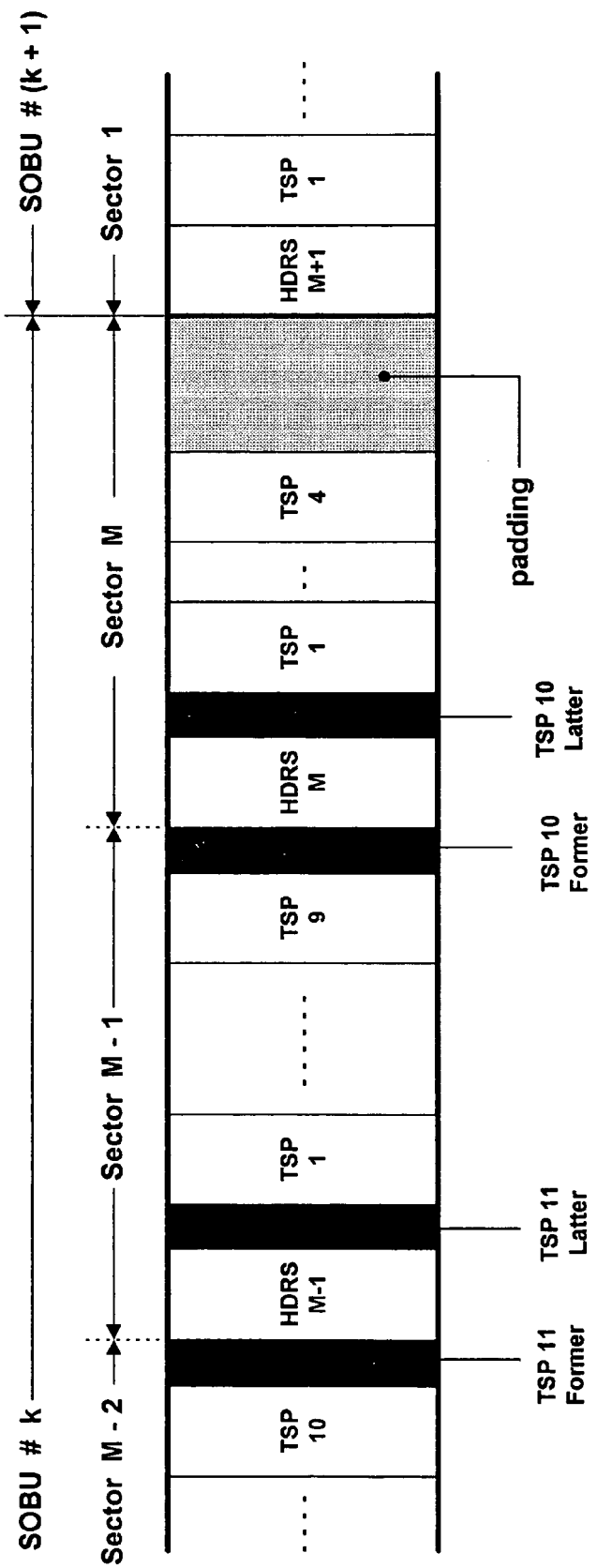
FIG. 5 is a pictorial representation of sectors and stream object units created by the recording method in accordance with the present invention.

FIG. 5 shows the syntax of sectors and stream object units created by the method of the present invention. The following explanation will refer to the digital data stream recording apparatus shown in FIG. 1.

Transports stream packets of a digital data stream received by the set top box 100 and transmitted through the IEEE-1394 communication interface are recorded sequentially on the recording medium 230 by a stream recording unit 220. When recording a received transport stream packet, a control unit 250 of the streamer 200 checks whether a 192-byte transport stream packet TSP10 can be added in the Sector M-1 in which the preceding transport stream packets (TSP1~TSP9) have been recorded, without exceeding the sector size, 2048 bytes.

If it is concluded that the transport stream packet TSP10 cannot be added to the Sector M-1, the control unit 250 controls the stream recording unit 220 so that the transport stream packet TSP10 is recorded across two sectors Sector M-1 and Sector M by dividing the transport stream packet TSP10 into first and second parts. The size of the first part of the divided transport stream packet TSP10 is determined by the difference between the sector size of 2048 bytes and the size of transport stream packets previously recorded in the sector M-1. Therefore the sector M-1 is completely packed with transport stream packets without a remaining area. The second part of the divided transport stream packet TSP10 is recorded in the next sector, Sector M.

The received digital data stream is recorded on the recording medium 230 after being buffered. When recording the Sector M-1 on the recording medium 230, the control unit 250 records the information on the divided transport stream packet TSP10 in the application header information. For example, the size of the second part of the transport stream packet TSP10 can be recorded in the COM_SZ field representing the size of a divided transport stream packet. If the second part of the transport stream packet TSP10 has a size of 30 bits, a value of '011110' is written in the COM_SZ field. The application header information is recorded on the recording medium 230 along with the Sector M-1.

Since transport stream packets are recorded in a sector with no padding area, the position of the first transport stream packet recorded in a sector without being divided is subject to change. Now that the size of the second part of the transport stream packet recorded across two sectors Sector M-1 and Sector M indicates the start position of the first sector recorded in the Sector M, the position of the first transport stream packet recorded in the Sector M without being divided can be found by the value of the COM_SZ field contained in the previous sector M-1. Instead of recording the size of the second part of a divided transport stream packet in the header of the sector in which the first part of the divided transport stream packet is recorded, it can be recorded in the header of the next sector in which the second part of the transport stream packet is recorded.

According to the recording scheme, a 2048-byte sector may contain a 100-byte header information (HDRS), 10 192-byte transport stream packets, and one or two divided transport stream packets. If only one divided transport stream is contained, it can be positioned in the leading part or ending part of the sector.

In the application header information, the field of AP_PK-T_Ns indicates the number of transport stream packets contained in the associated sector. In the conventional recording method, the number of transport stream packets contained in a sector is fixed as long as the size of a transport stream packet does not vary. In the recording method in accordance with the present invention, however, the number of transport stream packets contained in a sector may change.

When counting the number of transport stream packets contained in a sector, the leading bits of transport stream packets are counted for preventing double counting divided transport stream packets. If a data stream is recorded as in FIG. 5, the numbers of transport stream packets contained in the sectors Sector M-2, Sector M-1, and Sector M are 11, 10, and 4, respectively.

Suppose that a stream object unit comprises 32 sectors and the 31 sectors of a stream object unit SOBU#k have been created so far. When recording the 32nd sector of the stream object unit SOBU#k, it is checked whether the transport stream packet being recorded is the 324th transport stream packet. If so, the remaining area of the stream object unit SOBU#k after adding the 324th transport stream packet is padded with null data to make the size of the stream object unit SOBU#k 2048 bytes. Compared with the conventional recording method that creates 886 byte padding area, the recording method in accordance with the present invention dramatically increases the recording efficiency since only 128 bytes are used as the padding area in a sector.

The method for recording digital data streams in accordance with the present invention records received transport stream packets across sectors depending on the size of remaining areas of sectors and null data are inserted only into the last sector of each stream object unit, thereby minimizing the size of null data and increasing the recording efficiency.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording digital data, comprising:
   (a) recording, via a recorder, received digital data units sequentially in a predetermined recording unit, each digital data unit having a predetermined length;
   (b) checking, via a control unit, whether the size of the remaining area of the predetermined recording unit is less than the length of a digital data unit; and
   (c) recording, via the recorder, a received digital data unit across the remaining area of the predetermined recording unit and the next predetermined recording unit based upon the checked result.

2. The method set forth in claim 1, further comprising:
   (d) recording information on the number of digital data units contained in a predetermined recording unit, wherein the number varies based on a digital data unit recorded across two predetermined recording units.

3. The method set forth in claim 2, wherein said step (d) records said information on the number in a management information area pertaining to each predetermined recording unit.

4. The method set forth in claim 1, further comprising:
   (d) recording information on a start position of a first digital data unit of a predetermined recording unit, the start position varying as a digital data unit is recorded across two predetermined recording units.

5. The method set forth in claim 4, wherein said step (d) records said information on the start position in a management information area pertaining to each predetermined recording unit.

6. A method for recording digital data, comprising:
   receiving, via a receiver, user digital data from an external source in response to a user request or selection, the user digital data being divided into digital data units;
   recording, via a recorder, the received digital data units sequentially in a predetermined recording unit of a recording medium;
   calculating, via a control unit, a number of the digital data units recorded in the predetermined recording unit that have at least a first byte located in the predetermined recording unit and a start position of a first recorded digital data unit recorded in the predetermined recording unit, said number of the digital data units and the start position of the first recorded digital data unit being variable and not fixed; and
   recording, via the recorder, the number of digital data units and the start position of the first recorded digital data unit.

7. The method set forth in claim 6, wherein the predetermined recording unit has a size of 2048 bytes.

8. The method set forth in claim 6, wherein the predetermined recording unit is padded with null data after the last recorded digital data unit therein.

9. The method set forth in claim 6, wherein the number of digital data units and the start position of the first recorded digital data unit are recorded in the predetermined recording unit.

10. The method set forth in claim 6, wherein the number of digital data units and the start position of the first recorded digital data unit are recorded in a header information area of the predetermined recording unit.

11. The method set forth in claim 10, wherein the recording medium is a digital video disk (DVD).

12. The method set forth in claim 11, wherein the predetermined recording unit is padded with null data after the last recorded digital data unit therein.

13. The method set forth in claim 12 wherein the predetermined recording unit has a size of 2048 bytes.

14. An apparatus for recording digital data, comprising:
    a receiver configured to receive user digital data from an external source in response to a user request or selection, the user digital data being divided into digital data units;
    a recording unit configured to record the received digital data units sequentially in a predetermined recording unit of a recording medium; and
    a control unit configured to calculate a number of the digital data units recorded in the predetermined recording unit that have at least a first byte located in the predetermined recording unit and a start position of a first recorded digital data unit recorded in the predetermined recording unit, and causing said recorder to record the number of digital data units and the start position of the first recorded digital data unit, said number of the digital data units and the start position of the first recorded digital data unit being variable and not fixed.

15. The apparatus set forth in claim 14, wherein the predetermined recording unit has a size of 2048 bytes.

16. The apparatus set forth in claim 14, wherein the number of digital data units and the start position of the first recorded digital data unit are recorded in the predetermined recording unit.

17. The apparatus set forth in claim 14, wherein the number of digital data units and the start position of the first recorded digital data unit are recorded in a header information area of the predetermined recording unit.

18. The apparatus set forth in claim 14, wherein the predetermined recording unit is padded with null data after the last recorded digital data unit therein.

19. The method set forth in claim 6, wherein a last byte of a last digital data unit in the predetermined recording medium is in a next predetermined recording unit when the last digital data unit is recorded across the predetermined recording unit and the next predetermined recording unit.

20. The apparatus set forth in claim 14, wherein a last byte of a last digital data unit in the predetermined recording medium is in a next predetermined recording unit when the last digital data unit is recorded across the predetermined recording unit and the next predetermined recording unit.

21. A recording medium including data to be reproduced by a reproducing unit, the recording medium comprising:
    user digital data being divided into digital data units and being sequentially recorded in a predetermined recording unit of the recording medium; and a number of the digital data units recorded in the predetermined recording unit that have at least a first byte located in the predetermined recording unit and a start position of a first recorded digital data unit recorded in the predetermined recording unit, said number of the digital data units and the start position of the first recorded digital data unit being variable and not fixed.

22. The recording medium set forth in claim 21, wherein the predetermined recording unit has a size of 2048 bytes.

23. The recording medium set forth in claim 21, wherein the number of digital data units and the start position of the first recorded digital data unit are recorded in the predetermined recording unit.

24. The recording medium set forth in claim 21, wherein a last byte of a last digital data unit in the predetermined recording medium is in a next predetermined recording unit when the last digital data unit is recorded across the predetermined recording unit and the next predetermined recording unit.

* * * * *